United States Patent [19]

Gämmerler

[11] Patent Number: 4,612,835

[45] Date of Patent: Sep. 23, 1986

[54] DEVICE FOR CUTTING OUT A WASTE STRIP BETWEEN TWO USABLE STRIPS

[76] Inventor: Hagen Gämmerler, Ichoring 44, D-8021 Icking, Fed. Rep. of Germany

[21] Appl. No.: 691,924

[22] Filed: Jan. 16, 1985

[51] Int. Cl.[4] .............................................. B23D 19/06

[52] U.S. Cl. ....................................... 83/500; 83/923; 409/138

[58] Field of Search .......................... 409/138; 29/335; 83/500, 501, 502, 503, 495, 923, 408, 100, 302

[56] References Cited

U.S. PATENT DOCUMENTS

| | | | |
|---|---|---|---|
| 3,036,486 | 5/1962 | Wilcox | 83/500 X |
| 3,828,635 | 8/1974 | Klingen | 83/500 |
| 3,884,102 | 5/1975 | Faltin | 83/500 X |
| 3,996,828 | 12/1976 | Granger et al. | 83/500 |

FOREIGN PATENT DOCUMENTS

| | | | |
|---|---|---|---|
| 704128 | 2/1965 | Canada | 83/923 |
| 641235 | 1/1937 | Fed. Rep. of Germany | 83/501 |
| 3022772 | 1/1982 | Fed. Rep. of Germany | 83/500 |
| 987124 | 6/1965 | France | 83/502 |
| 837132 | 6/1960 | United Kingdom | 83/302 |
| 298476 | 10/1971 | U.S.S.R. | 83/923 |

*Primary Examiner*—William R. Briggs
*Attorney, Agent, or Firm*—Paul L. Sjoquist

[57] ABSTRACT

A device for continuously cutting out a waste strip between two usable strips of sheet or web material, including a cutting wheel disposed intermediate two counterpart wheels in closely adjacent alignment and with overlapping edges, and a plurality of pressing devices adapted for compressing the sheet or web material in the region of cutting, wherein the cutting wheel and the two counterpart wheels are rotatable in opposite directions.

9 Claims, 4 Drawing Figures

DEVICE FOR CUTTING OUT A WASTE STRIP BETWEEN TWO USABLE STRIPS

BACKGROUND OF THE INVENTION

The invention relates to a device for continuously cutting out a waste strip between two usable strips of sheet structures by means of two rotating cutting devices, wherein each is provided with a cutting edge arranged opposite to the other one, and of counterparts arranged opposite to and each overlapping the respective cutting devices.

A German Patent Publication, DE-PS No. 641,235, has made known a device of this kind in which from a continuously advanced paper web there is cut out a waste strip such that first the one edge of the waste strip is cut-in by a cutting knife arranged on a shaft in connection with a counter knife, and a second knife, which is arranged on a spaced-apart shaft carrying on the other side a symmetrical counter knife, cuts-in the second side of the waste strip.

This cutting method is not suitable for stacked or overlapping advanced paper products or cardboard products since in these cases the paper or cardboard layers have to be held together during the cutting process.

The invention has been based on the problem to make it possible that waste strips can be cut out in a satisfactory manner even in those cases in which more than one paper or cardboard layer are to be cut simultaneously.

SUMMARY OF THE INVENTION

According to this invention, the problem has been solved by the measures that for processing multi-layer paper products, preferably overlapping paper layers or the like, the cutting devices are arranged symmetrically and opposite to each other on a shaft, and at least one pair of pressing devices is advanced on either side of the cutting devices as far as to the cutting plane. It is therefore possible by means of the inventive device simultaneously to produce at least two superimposed paper products which are in a ready-for-use condition.

It is also possible to provide more than two cutting devices so as to manufacture more than two usable strips of sheet structures in the form of prospectuses or catalogues or also in the form of advertising prints or the like.

The counterparts can be in the form of counter-knives which are separately arranged on a shaft. Though this is also known from the DE-PS No. 641,235, in the case of the present invention the counter-knives can be provided beneath the twin cutting device so that less space is required.

It is furthermore possible to arrange one additional pressing device adjacent to each of the counter-knives. The cutting device, according to one embodiment, consists of two interconnected plate-shaped knives, and in this case the counter-knives can be driven in the opposite direction relative to the cutting device.

According to a modified embodiment, the cutting device is provided either with a concave grinding or with two oppositely directed bevel grindings; the cutting device can also be in the form of a disk-type milling cutter.

If there is provided a suction device extending to the cutting region to receive the shavings or chips, such suction device can be in the form of a tube and can be secured to the frame of the counter-knives.

In order to provide the possibility to use the inventive cutting device also in already existing paper processing systems, the device, which is in the form of a double-knife or a disk-type milling cutter, can together with its plane pressing device pair be mounted at a swivel arm; in this case, it is useful to mount the swivel arm at a supporting structure which is detachably mountable to an underframe of the cutting unit.

BRIEF DESCRIPTION OF THE DRAWINGS

The drawing shows several strongly schematisized representations of exemplifying embodiments of the invention which hereinafter are described in more detail, it is shown in FIG. 1 a front view of the assembled constructional units, FIG. 2 a side view along the line 2—2 in FIG. 1, FIG. 3 a detail of a modified embodiment, and FIG. 4 a detail of a third embodiment.

DESCRIPTION OF THE PREFERRED EMBODIMENT

Figure 1:
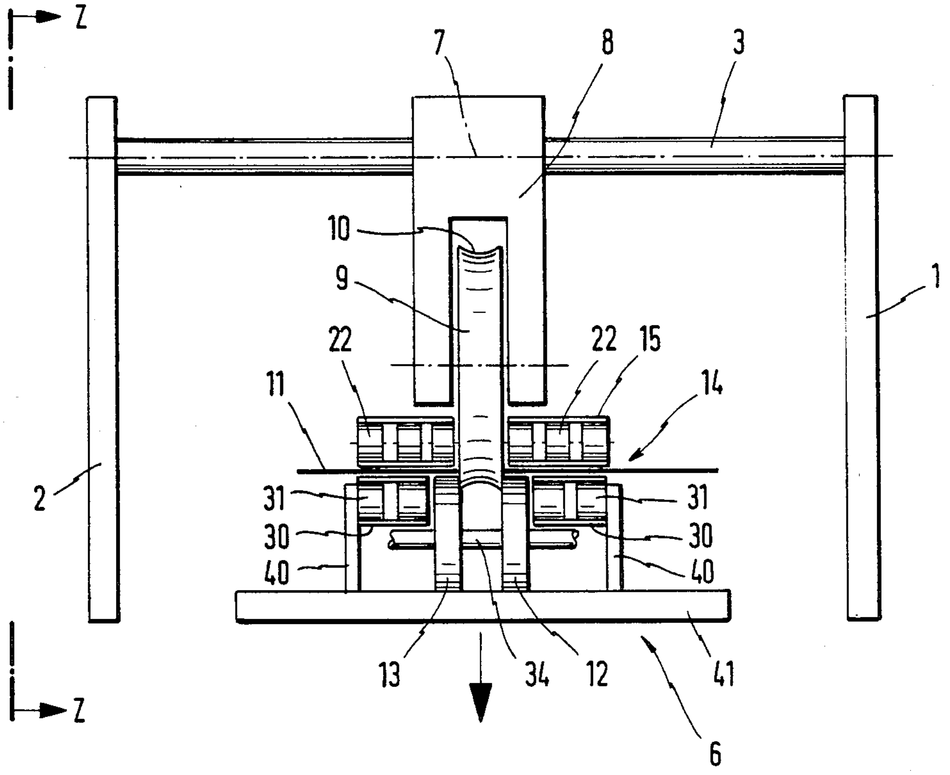

Two vertical consoles 1 and 2 of a supporting structure are connected with each other by a shaft 3 in bow-like manner. The open space between the two consoles is wide enough to permit mounting thereof above a provided cutting unit so that continuously advanced, overlapping paper stacks can be cut either on one side or on both sides. The two cutting implements which are shown are provided between the respective consoles and the actual constructional unit 6 of the cutting device.

The constructional unit 6, which hereinafter is described in more detail, can also be manufactured using a different mounting device to be usable as an independent cutting device.

Shaft 3 is adapted to hold swivel arm 8 which is pivotable about the axis 7 and is, for example, fork-shaped and carries a disk-type milling cutter 9 so that it is rotatable and drivable. The disk-type milling cutter 9 is provided with a concave grinding 10 and cooperates, relative to the overlapping layers 11 which are advanced vertically to the plane of the drawing, with two counter disks 12, 13. These counter disks, or counter-knives, overlap with the disk-type milling cutter 9, as can be seen from FIG. 1 and FIG. 2, so that at the location where the outer surface and the inner surface of the disk-type milling cutter and of the counter-knives coincide with each other, there are made cuts in the overlapping layers 11 which cause cutting edges which are sharp and straight-lined, so that the usable strips provided by the cutting devices each obtain ready-for-use edges.

Since during the continuous conveyance of the superimposed paper product or sheet structure, there may possibly occur, at the high speed of the disk-type milling cutter and of the counter-knives, burns of the paper, the pressing device 14 described hereinafter is constructed as follows.

The upper portion 15 of the pressing device 14 is symmetrically provided on either side of the disk type milling cutter 9 and consists of an endlessly conveyed belt 20 which runs over two end rollers 21, 22. In the region 20 (i.e. in engagement with the paper product advanced in overlapping layers), there are provided additional smaller supporting rollers between the two end rollers. The conveying belt 20 is turned round the end rollers 21, 22 and their guides at the smaller rollers (not shown) such that said rollers each are constructed as individual small units, whereby development of heat in the cutting zone is avoided.

In a smaller way, the lower portion of the pressing device is made of two belts 30 which are symmetrical and are facing the cutting plane and each are turned round end rollers 31 or 32 provided each in pairs.

Between the end rollers 31, 32, there are provided in the upper portion, i.e. at the level of the cutting devices, smaller supporting rollers which together with the rotating belts cause the sheet structures to be cut to be uniformly pressed.

The counter-knives 12 and 13, which are rotatable about an axis 34, are driven in a direction opposite to that of the disk-type milling cutter. The two lower portions of the pressing device 14 are mounted at supporting walls 40 which are mounted on a slide 41 which is movable in the direction towards the axis 34.

The swivel arm 8 can be pivoted into the region between the two cutting implements (not shown) of the cutting unit or out of this region, as required, and forms with the consoles 1 and 2 a constructional unit including also the upper portion of the pressing device 15.

The lower portion of the cutting devices forming an independent constructional unit includes the two counter-knives 12, 13, the lower portion of the pressing device 11 and the corresponding holding means.

Figure 3:
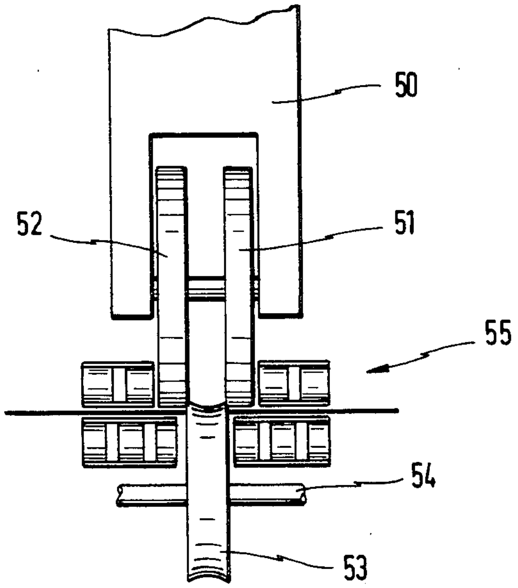

In case of the embodiment shown in FIG. 3, the swivel arm 50 is provided with two counter-knives 51, 52 which are synchronously drivable, whereas in the lower portion the disk-type milling cutter 52 is mounted to be rotatable about a shaft 54.

The upper portion and the lower portion of the pressing devices 55 are exchanged relative to the embodiment shown in FIG. 1. As in case of FIG. 1, the two portions of the pressing device 55 are tensioned relative to each other or are subjected to prestressing so as to make possible to precisely advance and hold the overlapping paper layers in the cutting zone.

Figure 4:
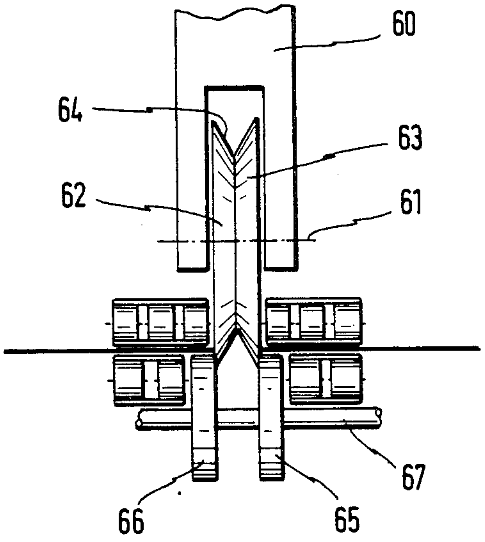

The embodiment shown in FIG. 4 is based in principle on the same arrangement of the constructional members as described in connection with FIGS. 1 and 2.

The swivel arm 60, which is in the form of a yoke, carries two separate knives 62 and 63 which are mounted to be rotatable about an axis 61 and are tensioned relative to each other and whose cutting surfaces are provided at the external sides.

The knives 62, 63 which are provided with a bevel grind 64, are arranged symmetrically to each other and rotate between counter-knives 65 and 66 which in turn are drivable via a shaft 67 in a direction opposite to that of the knives 62 and 63.

The pressing device of this embodiment is like that described in connection with FIGS. 1 and 2.

Figure 2:
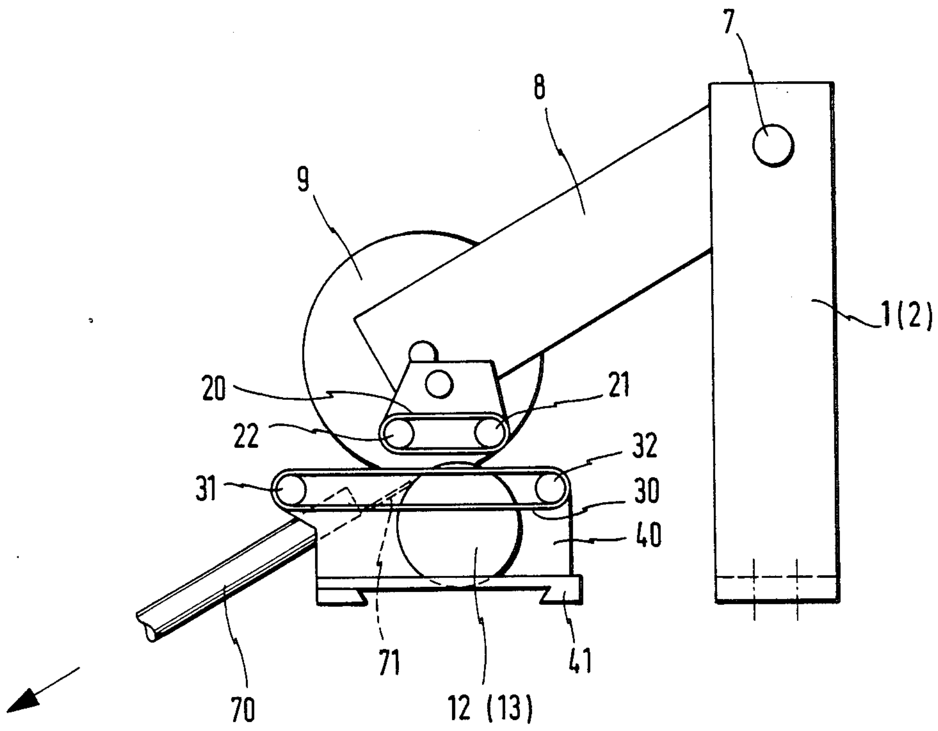

FIG. 2 shows a tube 70 as a component part of a suction device which has a lip 71 engaging into the recess of the disk-type milling cutter 9, causing the chips and shavings to be removed in the region of the waste strip. The tube 70, which is subjected to a suction effect, is stationarily connected to the wall portions 40 or the slide 41 and is rigidly fixed.

The main knife or central knife pair can also have a saw-toothed grinding. In this case, the driven main knife pair is usefully manufactured of two symmetrical parts.

What is claimed is:

1. A device for continuously cutting out a waste strip between two usable strips of sheet structures comprising a circular cutting wheel rotatably mounted about an axis on a first shaft, said cutting wheel having two axially spaced symmetrical cutting edges about its circumference; a pair of counterpart wheels rotatably mounted on a second shaft, each of said counterpart wheels each having a circumferential edge positioned closely adjacent to and in overlapping relationship to one of said cutting edges; a first pair of endless loop conveying belts, one of said first pair of endless loop conveying belts being aligned closely adjacent each of said counterpart wheels with the belt path of travel including a first plane substantially tangential to the circumference of the adjacent counterpart wheel; a second pair of endless loop conveying belts, one of said second pair of endless loop conveying belts being aligned closely adjacent each side of said cutting wheel with the belt path of travel including a second plane substantially parallel to said first plane, said second pair of endless loop belts being a least partially justaposed with said counterpart wheels; and means for compressing said sheet structure between said first and second pairs of endless loop belts in the region of said overlapping relationship between said cutting wheel and said counterpart wheels.

2. The apparatus of claim 1 wherein said counterpart wheels each respectively have a cutting edge adjacent to said cutting wheel cutting edges.

3. The apparatus of claim 1, further comprising a swivel arm mounted to a frame, said swivel arm having an end connected to said sheet structure pressing devices.

4. The apparatus of claim 1, wherein said cutting wheel further comprises two symmetrical circular blades aligned closely adjacent one another on said first shaft.

5. The apparatus of claim 1, further comprising means for rotating said first shaft and said second shaft in opposite directions.

6. The apparatus of claim 1, wherein said cutting wheel further comprises a concave periphery about its circumference.

7. The apparatus of claim 6, wherein said cutting wheel further comprises a disk milling cutter.

8. The apparatus of claim 1, further comprising a suction tube having an opening proximate said cutting wheel.

9. The apparatus of claim 3, wherein said counterpart wheels are detachably mounted to said frame and said cutting wheel is mounted to said swivel arm.

* * * * *